July 7, 1942.    J. A. LINDSEY    2,288,814
MEANS FOR SEPARATING MIXED INGREDIENTS
Filed Nov. 28, 1939    2 Sheets-Sheet 2
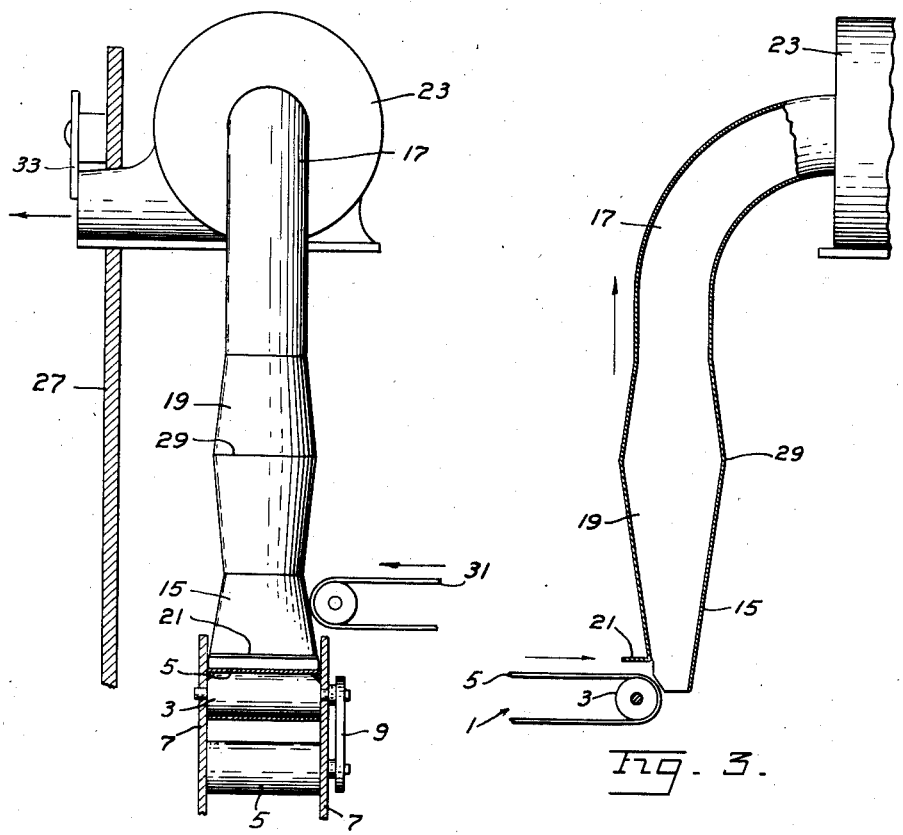
Fig. 2.
Fig. 3.
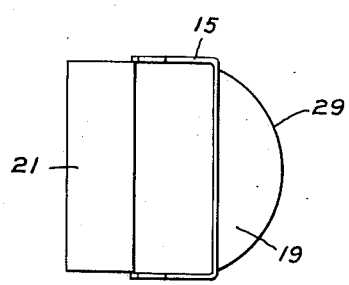
Fig. 4.
INVENTOR.
JAMES A. LINDSEY
BY Charles O. Bruce
ATTORNEY.

Patented July 7, 1942

2,288,814

UNITED STATES PATENT OFFICE 2,288,814

MEANS FOR SEPARATING MIXED INGREDIENTS

James A. Lindsey, Berkeley, Calif.

Application November 28, 1939, Serial No. 306,483

1 Claim. (Cl. 209—138)

My invention relates to the shelling of nuts and to a means for accomplishing the same.

My invention has for its objects, to provide an improved means and method for effecting separation of the meats from the shells of cracked nuts; to provide such means and method which shall be more efficient in the removal of the shells from the meats; to provide such a means and method embodying a novel principle of "meat from shell" separation; to provide apparatus for carrying out my improved method which shall be simple in construction and economical to manufacture. Additional objects of my invention will be brought out in the following description of the same taken in conjunction with the accompanying drawings wherein—

Figure 2 is a vertical end view looking in the direction of the arrows on the line 2—2 of Figure 1.

Figure 3 is a vertical side view of a portion of one of the stages of the assembly of Figure 1, showing the suction conduit partly in section.

Figure 4 is a view looking into the intake end of a suction conduit.

Figure 1:
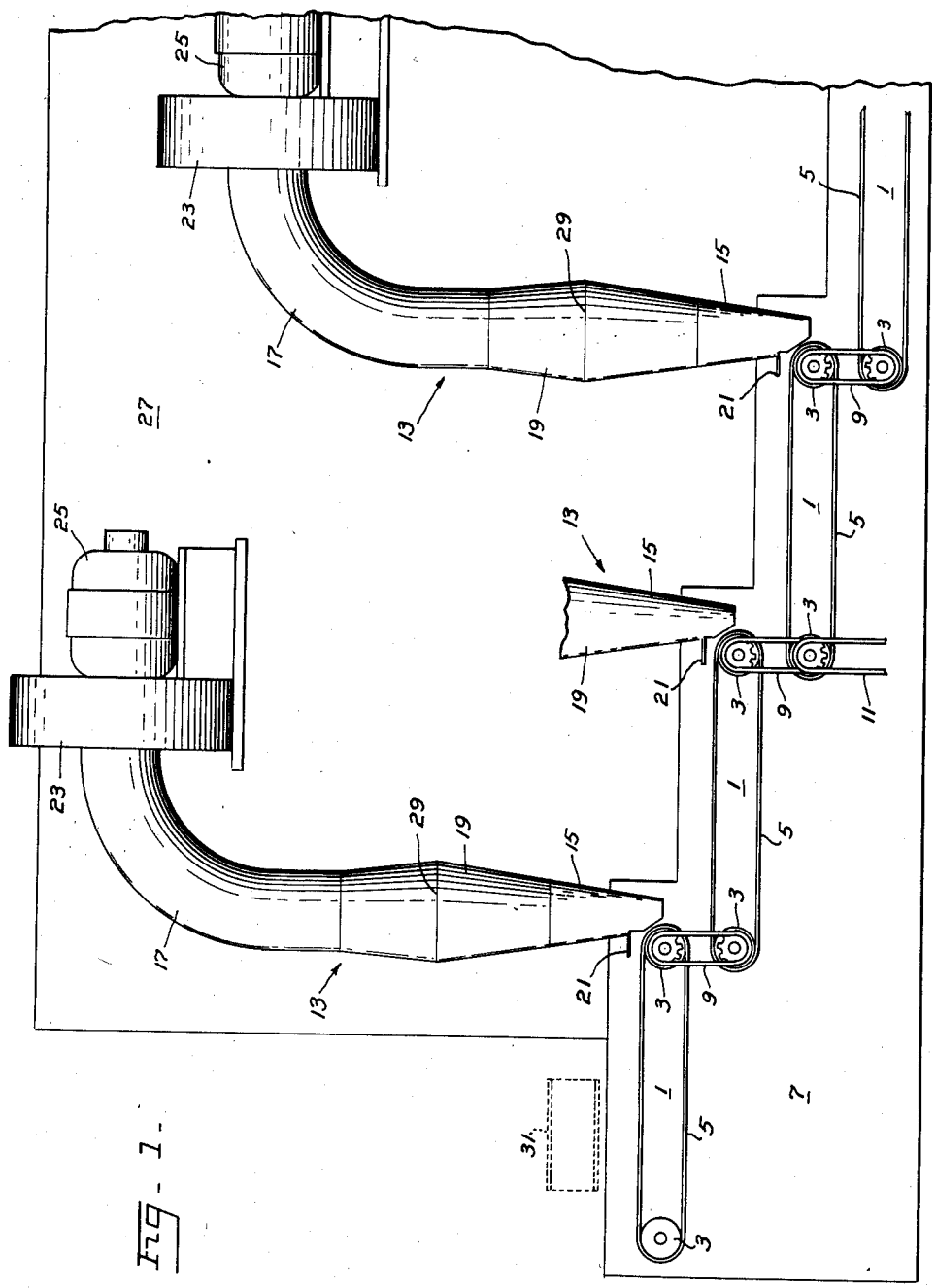
Figure 1 is a vertical longitudinal view of an assembly including a plurality of stages, each embodying my invention.

The above figures are drawn to scale.

Referring to the drawings, it will be noted that the apparatus comprises a plurality of endless conveyors 1 serially disposed in step down arrangement, that is, with the receiving end of each succeeding conveyor being disposed below the discharge end of its preceding conveyor and in position to receive the discharge from such preceding conveyor. Each conveyor includes a pair of end rollers 3 carrying an endless belt 5, the rollers being rotatably supported by parallel side walls 7 extending upwardly above the belts to act as guards for the material carried by the conveyors.

The discharge and receiving ends of adjacent conveyors are interconnected by chain drives 9, thereby enabling the entire series of conveyors to be operated from a single power source (not shown) which may be connected in a driving connection 11 to any one of the rollers of the conveyors, though preferably to one of the intermediate conveyors.

At the discharge end of each conveyor there is located a suction conduit 13. A conveyor and its associated suction conduit constitute a stage. The conduit may be considered as being comprised of three sections, these constituting the intake section 15, the discharge section 17 and an intermediate section 19. The intake section at the intake end thereof is of substantially rectangular cross-section (see Figure 4) and at its other end, where it joins to the intermediate section, it becomes of circular cross-section. The longer dimension of the rectangular cross-section portion at the intake opening is transverse to and equal to the width of the conveyor belt 5, and the conduit is so positioned adjacent the discharge end of the conveyor as to expose but a portion of this intake opening to the belt surface. The greater portion of the intake opening is caused to overhang or extend beyond the belt surface. When so positioned, the belt may be considered as dividing the intake opening into two sections, the smaller of which is exposed to the belt surface. A guide lip 21 may be provided along that edge of the intake opening above the discharge end of the conveyor, such lip being in spaced relationship to the belt surface.

The discharge section 17 of the suction conduit 13 is uniform and circular in cross-section with its discharge end entering the housing 23 of a blower driven by a suitable electric motor 25 and mounted on a suitable supporting wall 27. The blower discharges through an opening in this wall. The diameter of the discharge section 17 of the conduit is such that its cross-sectional area approximately equals that of the intake section 15 at the intake opening.

The intermediate section 19 of the suction conduit is bellied such that at its mid-point 29 its cross-sectional area is somewhat greater than at any other point in the entire suction pipe or conduit.

In the operation of the assembly, cracked nuts are dropped upon the first conveyor belt of the series, from the discharge end of a conveyor 31 leading from a nut cracking machine (not shown). In dropping from the latter conveyor 31 to the first conveyor of the series, the nuts tend to spread, thereby effecting a loosening of the shell fragments from the meats. The mixture is carried to the discharge end of the conveyor where it will be exposed to the influence of the suction conduit 13 of the first stage and the first separation of shell from meat occurs. Inasmuch as what happens at this point in the first stage will be repeated at subsequent stages, it might be well at this time to explain the manner in which the suction conduit functions to effect such results.

The air velocity or the degree of suction produced in the conduit, at the intake end when adjusted for proper operation, is insufficient to carry off the kernels and larger fragments of the meat of the nuts, as well as those shells which stick to the conveyor, and these accordingly are permitted to drop from the conveyor of the first stage to the conveyor of the second stage. Any large shell portions still adhering thereto will also drop to the conveyor of the next stage, but, due to the impact in dropping to the subsequent belt, separation of the shell from the meat is very apt to occur and thus such shell fragments will be removed at some subsequent stage of the assembly.

It is not desirable to permit the smaller meat fragments broken from the kernel during the cracking operation to escape through the suction conduit along with the loose shell fragments, and separation of these from the shell fragments cannot be realized at the intake opening through any adjustment of velocity at this point, without incurring considerable loss of the smaller meat fragments. They are accordingly permitted to enter the suction conduit which, due to its construction, effects the desired separation in the intermediate section 19 thereof. As the mixture is lifted in the conduit and approaches the middle of the intermediate section, a diminution in velocity occurs, due to the enlarged cross-section of the conduit at this point, although the velocity will again pick up to substantially its initial velocity in the discharge section 17 of the conduit. When the velocity at the intake opening is of proper value, and with the intermediate section 19 of the conduit properly adjusted as to dimensions, such a critical determination of the velocity in the bellied or intermediate section can be obtained as to bring about a highly efficient separation of the shell fragments from the meat fragments. The shells will be carried through the region of reduced velocity into the discharge section 17 of the conduit from which they will enter the blower casing at a velocity comparable to the velocity at the intake end. The meat fragments on the other hand, become suspended in the air stream in the bellied section and will be maintained in constant agitation therein until they enter a cross-sectional portion of the air stream where the velocity is insufficient to support them and they will then fall through upon the belt of the following stage.

Such cross-sectional portion of insufficient supporting velocity exists in the conduit 13 by reason of the above recited division of the intake opening into two unequal portions with the conveyor belt 5 exposed only to the influence of the smaller section of the opening. The air velocity through the smaller section will necessarily be greater than that through the larger section. Consequently, if the higher velocity be such as is required to carry off the shell fragments from the mixture on the belt, the lower velocity will necessarily be insufficient to support any of the meat fragments carried up with the shell fragments and subsequently separated out in the intermediate section 19. The intake velocity may be adjusted to the proper value, not only by altering the speed of the blower 23, but also by means of a gate 33 pivoted at one end to the wall 27 and adapted to be swung across the discharge outlet of the blower to any desired extent. The exact dimensions of the intermediate section 19 on the other hand, for maximum efficiency, are determined more or less experimentally, it being observed that a shortening of the intermediate section permits a larger percentage of the meat component to pass through the conduit, as will also a reduction in the cross-sectional area of the intermediate section, and that an increase in the cross-sectional area of the intermediate section will permit the shell fragments to drop down upon the succeeding conveyor along with the meat portions.

The separating function of the intermediate section, according to my analysis, does not rely to any great extent upon any difference in specific gravity between the meat and shell, but is dependent for its efficacy upon a new principle in which advantage is taken of a uniformly prevailing difference in structure between the shell and meat fragments. This structural difference has its origin in the fact that the shell, as the name implies, is relatively thin but has a large surface area, whereas the kernel of a nut is of considerable thickness and, when broken, produces fragments of substantial thickness with respect to their size. Consequently, shell fragments and meat fragments having the same volume will nevertheless differ in their $S/W$ ratio where $S$ equals the projected surface area which might be exposed to an airflow, and $W$ equals the weight of the fragment. The shell pieces in their course through the conduit will consequently present a greater projected surface area per unit weight to the flow of air than the nut meats, and the bellying of the intermediate section offers a means of obtaining that critical adjustment of velocity enabling the airflow to differentiate between the shell fragments and meat particles.

It will be apparent from the above description of my invention that the same will fulfill all the objects of my invention, and that the same is susceptible to modification and variation without departing from the principles involved. I accordingly do not desire to be limited in my protection to the specific details recited above, except as may be necessitated by the prior art and the appended claim.

I claim:

Apparatus for effecting a separation of shells from the meats of nuts comprising a series of belt type conveyors arranged with the receiving end of each conveyor below the discharge end of a preceding conveyor, and a blower system including a suction conduit of enlarged intermediate section associated with each of said conveyors, each of said conduits having an intake end disposed at the discharge end of its associated conveyor with a minor portion of said intake end exposed to the carrying surface of said conveyor and a major portion of said intake end overhanging the discharge end of said conveyor to occupy a position above the receiving end of the next conveyor in said series.

JAMES A. LINDSEY.